May 28, 1935.   C. R. HANNA   2,003,048

PHOTOPHONE APPARATUS

Filed Feb. 2, 1931

WITNESSES:
R. J. Fitzgerald
Hymen Diamond

INVENTOR
Clinton R. Hanna.
BY
Charley R. Carr
ATTORNEY

Patented May 28, 1935

2,003,048

UNITED STATES PATENT OFFICE 2,003,048

PHOTOPHONE APPARATUS

Clinton R. Hanna, Pittsburgh, Pa., assignor to Westinghouse Electric & Manufacturing Company, a corporation of Pennsylvania Application February 2, 1931, Serial No. 512,978

9 Claims. (Cl. 271—2.3)

My invention relates to regulating apparatus and has particular relation to regulating apparatus of a type utilized to maintain uniformity in the motions of mechanical systems.

Regulating apparatus of this type has been known in the past as mechanical filtering apparatus. Filtering systems, constructed and operated according to the teachings of the prior art, ordinarily comprise a mass resiliently coupled to a prime mover and a lubricated brake adapted to render the motion of the mass nonoscillatory in character. A lubricated brake of the type utilized in the systems of the prior art has the disadvantage that it imposes a constant load on the prime mover and that, in consequence thereof, the motion of the mass is not altogether uniform.

My invention is particularly applicable to rotating apparatus and in such apparatus the mass is customarily a flywheel. By the term "flywheel" I mean an element which is to be rotated and which has a moment of inertia that is large in comparison with the moments of inertia of the other rotating elements in the system.

Furthermore, by reason of the constant load imposed on the fly wheel, the spring is excessively deflected and, at times, does not render the service for which it is designed. As the deflection of the spring increases, its restoring force increases and, in consequence thereof, a brake designed to provide critical damping proves insufficient to prevent oscillation under actual working conditions.

It is, accordingly, an object of my invention to provide a filtering system wherein the damping is discontinuously applied.

A further object of my invention is to provide a filtering system wherein the damping is applied only when there is a tendency to variation in the motion.

An additional object of my invention is to provide a filtering system wherein the damping medium is substantially at rest, relative to the mass tending to produce uniformity in the motion, and only moves when there is a tendency to variation in the motion of the mass.

More specifically stated, it is an object of my invention to provide, in a filtering system of the type including a movable mass, resiliently driven from a prime mover, a lubricated brake for critically damping the mechanical system including the resilient coupling and the mass, the said brake being of a type that has an average velocity of zero relative to the mass.

According to my invention, I provide a filtering system for a rotary body wherein an inertial mass is fixed on the shaft through which the rotating body in question is driven. The mass is motivated from the prime mover through a resilient coupling and, in rotating, causes the shaft to rotate.

A second inertial mass, coupled to the first mass through a lubricated brake, is mounted on the shaft in such manner as to be rotatable relative thereto. The second mass is driven, through the lubricated brake, from the first mass and, when the velocity of the first mass tends to vary, it moves relative to the brake and its motion is consequently damped.

As will appear hereinafter, for critical damping, the second mass must have a predetermined inertia depending upon the inertia of the first mass. Specifically, it appears that the inertia of the second mass must be at least eight times the inertia of the first mass.

The novel features that I consider characteristic of my invention are set forth with particularity in the appended claims. The invention itself, however, both as to its organization and its method of operation, together with additional objects and advantages, will best be understood from the following description of a specific embodiment, when read in connection with the accompanying drawing, in which Figure 1 is a view, in section, illustrating a specific embodiment of my invention;

Figure 1:
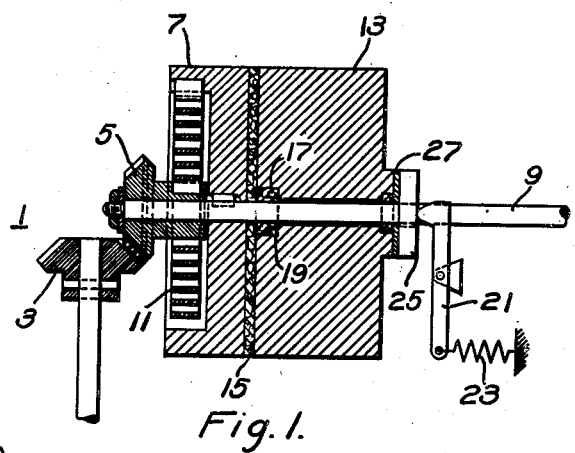

The apparatus shown in Fig. 1 comprises a power-transmission system 1 including a plurality of gears 3 and 5 operated from a prime mover (not shown) and coupled to a fly wheel 7, keyed to a driven shaft 9, through a clock spring 11. The driven gear 5 on the power-transmission system 1 floats on the shaft 9.

A second fly wheel 13 is supported on the shaft 9 but is rotatable relative thereto. It is driven from the first fly wheel 7 through a brake comprising a washer 15 that is retained in a permanently lubricated condition by a lubricant 17 disposed in a cylindrical cavity 19 in the second fly wheel.

Pressure is applied between the surface of the fly wheels 7 and 13 and the brake 15 by a lever 21 suitably mounted adjacent to the system and is responsive to the action of a spring 23 that causes it to exert a resilient force on a cylindrical washer 25. The washer 25 engages a brake 27 which, in turn, is adapted to exert a small force on the fly wheel 13 that floats on the shaft 9.

It will be noted that the base area of the washer 27 is small, as compared with the area of the bases of the fly wheels 7 and 13 and, consequently, the brake force of the washer is negligible in comparison with the force transmitted from the fly wheel 7 to the fly wheel 13.

It is to be understood that the method of applying a normal force between the fly wheels 7 and 13, as illustrated in Fig. 1, is to be regarded as symbolical of any of the well known contrivances that may be utilized in this connection.

The apparatus of the type illustrated in Fig. 1 represents a comparatively complicated system and, consequently, a system which has a comparatively complex motion under forces. The mere provision of damping for the system does not assure the designer that the system will be damped to at least the critical degree, and, as a result, a mathematical analysis of the system is required to determine the necessary relations between the constants of the system for critical damping. This analysis is best accomplished by resorting to a study of the electrical analogue of the mechanical system.

Figures 2, 3:
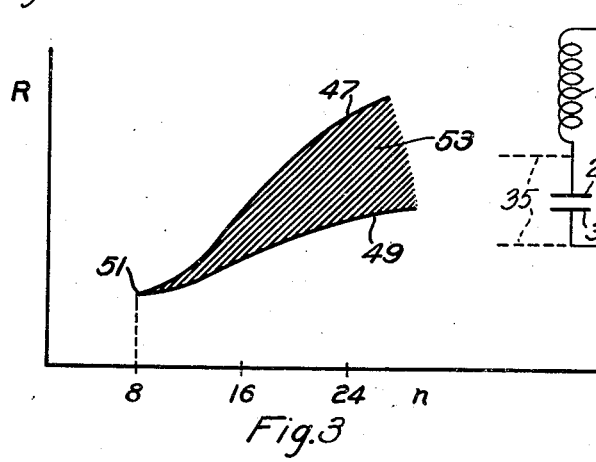
Fig. 2 is a schematic diagram showing the electrical analogy of the mechanical system illustrated in Fig. 1.
Fig. 3 is a graph that is utilized in illustrating the relation between the inertias and the damping resistance incorporated in the apparatus illustrated in Fig. 1.

The diagram, illustrated in Fig. 2, illustrates the electrical analogy of the system.

The mechanical power impressed on the system is represented by an electromotive force impressed across the plates 29 and 31 of a capacitor 33 analogous to the clock spring 11. As illustrated in the view, the electromotive force is impressed across two terminals 35, shown by broken lines. An inductance 37, representative of the mass 7 keyed to the shaft 9, is connected to one capacitor plate 29 and to a terminal of a resistor 39, representative of the viscous damping brake 15. The resistor 39 is, in turn, connected to the remaining plate 31 of the capacitor 33. A second inductor 41, representative of the fly wheel 13, that is rotatable relative to the driven shaft 9, is connected across the terminals of the resistor 39.

In making the analogy, the analogue of a mechanical velocity is assumed to be an electrical current, and, consequently, a constant electrical current in the circuit 43, including the inductor 37, the capacitor 33 and the coupling resistor 39, is representative of a constant velocity of the driven shaft.

The Kirchoff equation for the network, including these constants, is most simply obtained by assuming that an instantaneous electromotive force E is impressed across the resistor 39, which will be designated as R. The equation for the point 45 of the system is then given by (1) $$\frac{E}{Lp+\frac{1}{Cp}}+\frac{E}{R}+\frac{E}{pnL}=0$$

in which L is the inductance of inductor 37, representative of the moment of inertia of the mass 7 coupled to the driven shaft 9, R is the electrical resistance representative of the mechanical resistance, C is the capacity representative of the reciprocal of the constant of the clock spring (i. e., the compliance of the spring), $n$ is a factor representing the ratio of the moment of inertia of the mass 13, movable relative to the shaft 9, to the moment of inertia of the mass 7 fixed on the shaft 9, and $p$ is the Heaviside operator.

It is to be noted that, for rotary motion, the constant of the spring is defined as the angle of twist per unit of twisting torque and the mechanical resistance R is defined as the resistance torque, between a lubricating medium and a body rotating relative thereto, per unit of angular velocity. Both constants are determined experimentally for any particular lubricating system. For translational systems, the constant of the spring is defined as the elongation per unit of tensional force and the resistance is defined as the resistant force between two media per unit angular velocity of one relative to the other. It may be pointed out that the constants must be introduced into the equation in a consistent manner relative to their units. If the C. G. S. system is utilized, for example, all of the constants must be in the units. The maintenance of a consistency in the physical units employed is a thing necessary in all physical measurements, and the ways of doing it are familiar to those skilled in the art. The relation 1, when simplified, becomes (2) $(nL^2C)p^3+[RLC(n+1)]p^2+nLp+R=0$ The Equation (2) is a cubic linear differential equation with constant coefficients, and its discriminant may be written as (3) $D=b^2c^2+18abcd-4ac^3-4b^3d-27a^2d^2$ wherein $a$, $b$, $c$ and $d$ represent the coefficients of the powers of $p$ in the Equation (2).

The mechanical system is critically damped when the discriminant is equal to zero, that is, (4) $b^2c^2+18abcd-4ac^3-4b^3d-27a^2d^2=0$ When Equation 4 is expressed in terms of the actual constants of the system and R is evaluated, it becomes (5) $$R=\sqrt{\frac{L}{C}n^2\frac{n^2+20n-8\pm\sqrt{n(n-8)^3}}{8(n+1)^3}}$$

wherein R is expressed as a function of L, C and $n$, the latter being regarded as an independent variable.

In Fig. 3, R is plotted as a function of $n$. It is to be noted that the curve comprises two branches 47 and 49 joining at a nodal point 51, at a value of $n=8$. The shaded area 53 within the branches of the curve represents values of the coordinates for which the system to which the curve relates is, at least, critically damped. For points external to the shaded area, the system is oscillatory. It is seen that, for critical damping, the ratio between the inertias of the fly wheels 7 and 13 must be at least 8 and may be greater than 8, provided the viscous damping has requisite values.

My invention has been described hereinabove as specifically applied to a rotary system. It is apparent that my invention is equally as well applicable to a translational system and includes such systems within its scope of equivalents.

Furthermore, in the embodiment of my invention that is here illustrated, a flywheel 7 is driven through gears. Systems in which the flywheel is driven in any other manner are equivalents which lie within the scope of my invention.

Figure 4:
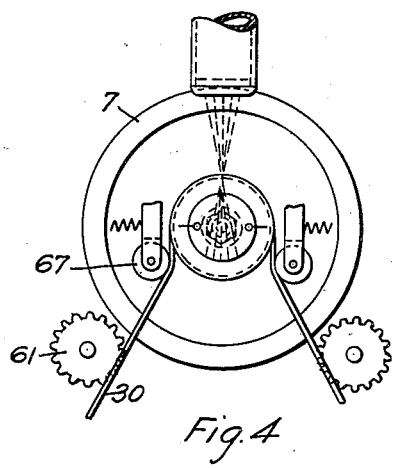
Fig. 4 is a view in end elevation showing a modification of my invention.
Figure 5:
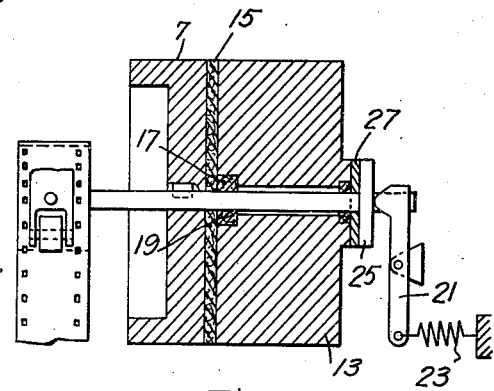
Fig. 5 is a view partly in longitudinal section and partly in side elevation of the modification shown in Fig. 4.

As shown in Figs. 4 and 5, the flywheel 7 may also be driven from a flexible belt or chain, a non-flexible belt or chain, driven from a flexibly mounted pulley or sprocket, or a non-flexible belt or chain such as a film 30 driven from a rigidly mounted pulley or sprocket wheel 61 but rendered resilient by a flexibly mounted idler 67 that varies the tension thereof.

It is to be noted that the last-mentioned modification of my invention is particularly usable in the photo-acoustic art wherein it is desirable to utilize the inertia of a film-driven flywheel such as 7 to maintain the velocity of the film 30 uniform. The film 30, in turn, is resiliently driven from a sprocket wheel 61 as shown. It will be noted that in the modifications shown in Figs. 4 and 5, my invention is applied to a system of the type illustrated in Fig. 2 of the Patent No. 1,713,726 to Vogt, et al.

Finally, it is well to point out that the mass 7 may have negligible inertia, in comparison with the mass 13. In such case, the principal impedance, to pulsations of the driven shaft, resides in the lubricated damping medium 15.

I claim as my invention:

1. In a mechanical filtering system capable of use in film-advancing devices, a film-driven element affixed to a shaft, a second element having the characteristics of a flywheel floating freely on said shaft, and means for coupling said first element to said second element through a lubricated medium, characterized in that the film-driven element has negligible inertia as compared to the second element.

2. In a mechanical filtering system capable of use in film-advancing devices, a film-driven element affixed to a shaft, a second element having the characteristics of a flywheel floating freely on said shaft, and means for coupling said first element to said second element through a lubricated medium, characterized in that the film is driven by a sprocket, further characterized in that means are provided for resiliently bearing against said film between the sprocket and the film-driven element and still further characterized in that the film-driven element has negligible inertia as compared to the second element.

3. A mechanical filtering system comprising a driving means, a driven shaft, a flywheel fixed on said shaft, means resiliently connecting said driving means to said flywheel for driving said driven shaft, a second flywheel, and means frictionally connecting said flywheels.

4. A mechanical filtering system comprising a driving means, a driven shaft, a flywheel fixed on said shaft, means resiliently connecting said driving means to said flywheel for driving said driven shaft, a second flywheel and a lubricated damping medium connecting said flywheels.

5. A mechanical filtering system comprising a driving means, a driven shaft, a flywheel fixed on said shaft, means resiliently connecting said driving means to said flywheel for driving said driven shaft, a second flywheel floating on said shaft and means frictionally connecting said flywheels.

6. A mechanical filtering system comprising a driving means, a driven shaft, a flywheel fixed on said shaft, means resiliently connecting said driving means to said flywheel for driving said driven shaft, a second flywheel floating on said shaft, said second flywheel having a moment of inertia of at least eight times the moment of inertia of said first flywheel and means frictionally connecting said flywheels.

7. A mechanical filtering system comprising a driving means, a driven shaft, a flywheel having a moment of inertia $M$ fixed on said shaft, means resiliently connecting said driving means to said flywheel for driving said driven shaft, said connecting means having a compliance $k$, a second flywheel, having a moment of inertia $M$, floating on said shaft and means frictionally connecting said flywheels, said means having a mechanical resistance $R$ of magnitude satisfying the inequality $$\sqrt{\frac{M}{k}n^2}\frac{n^2+20n-8+\sqrt{n(n-8)^3}}{8(n+1)^3} > R > \sqrt{\frac{M}{k}n^2}\frac{n^2+20n-8+\sqrt{n(n-8)^3}}{8(n+1)^3}$$

8. A mechanical filtering system comprising a driving means, a driven means, inertia means fixed on said driven means, means resiliently connecting said driving means to said inertia means for driving said driven means, a second inertia means and means frictionally connecting said first-named and said last-named inertia means.

9. In a mechanical filtering system capable of use in film-advancing devices, a film-driven element affixed to a shaft, a second element having the characteristics of a flywheel floating freely on said shaft, and means for coupling said first element to said second element through a lubricated medium, characterized in that the inertia of the second element is at least 8 times the inertia of the film-driven element.

CLINTON R. HANNA.